Figure 11:
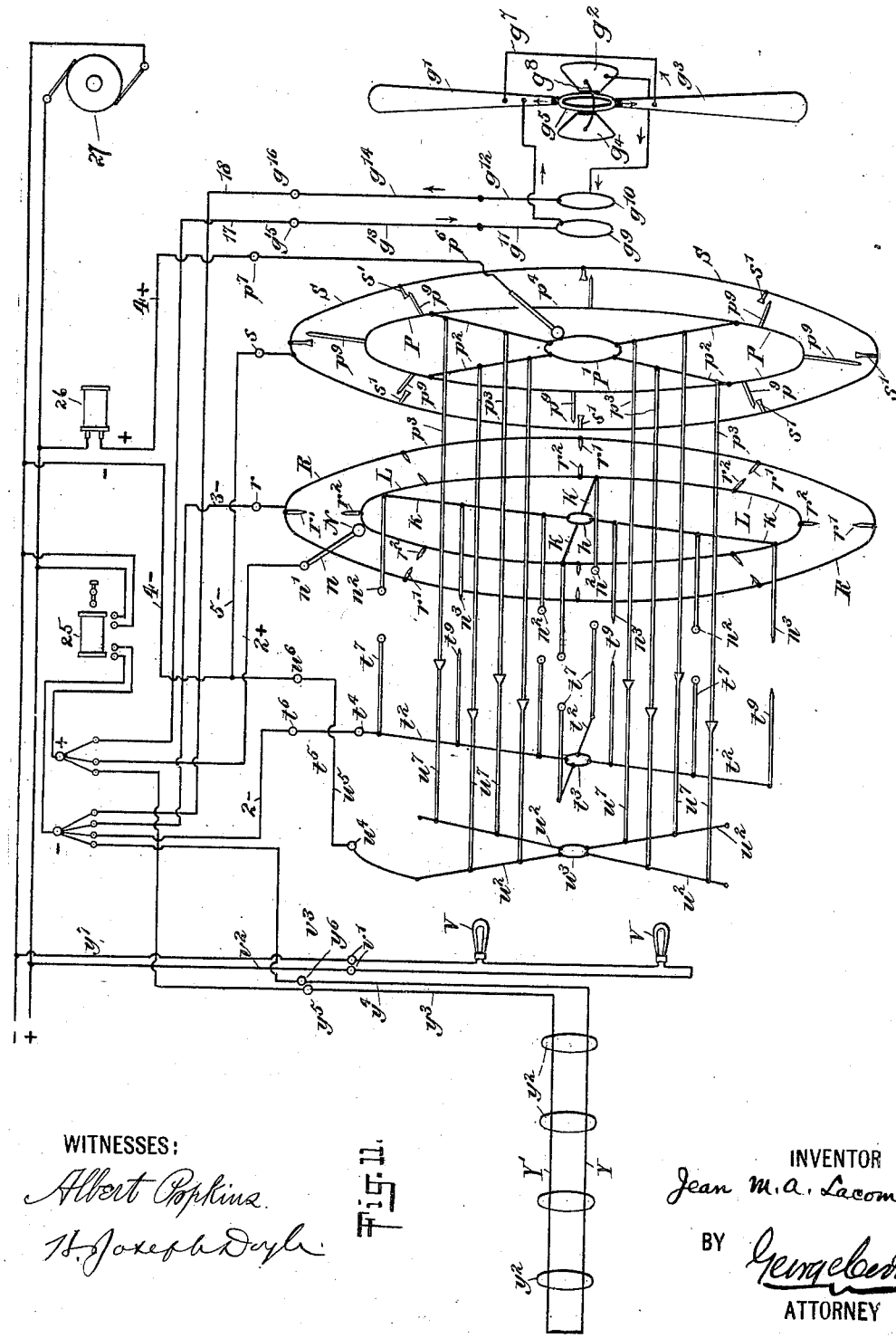

No. 672,230. Patented Apr. 16, 1901.
J. M. A. LACOMME.
APPARATUS FOR THE PURIFICATION OF WATER.
(Application filed Oct. 24, 1900.)
(No Model.) 3 Sheets—Sheet 1.
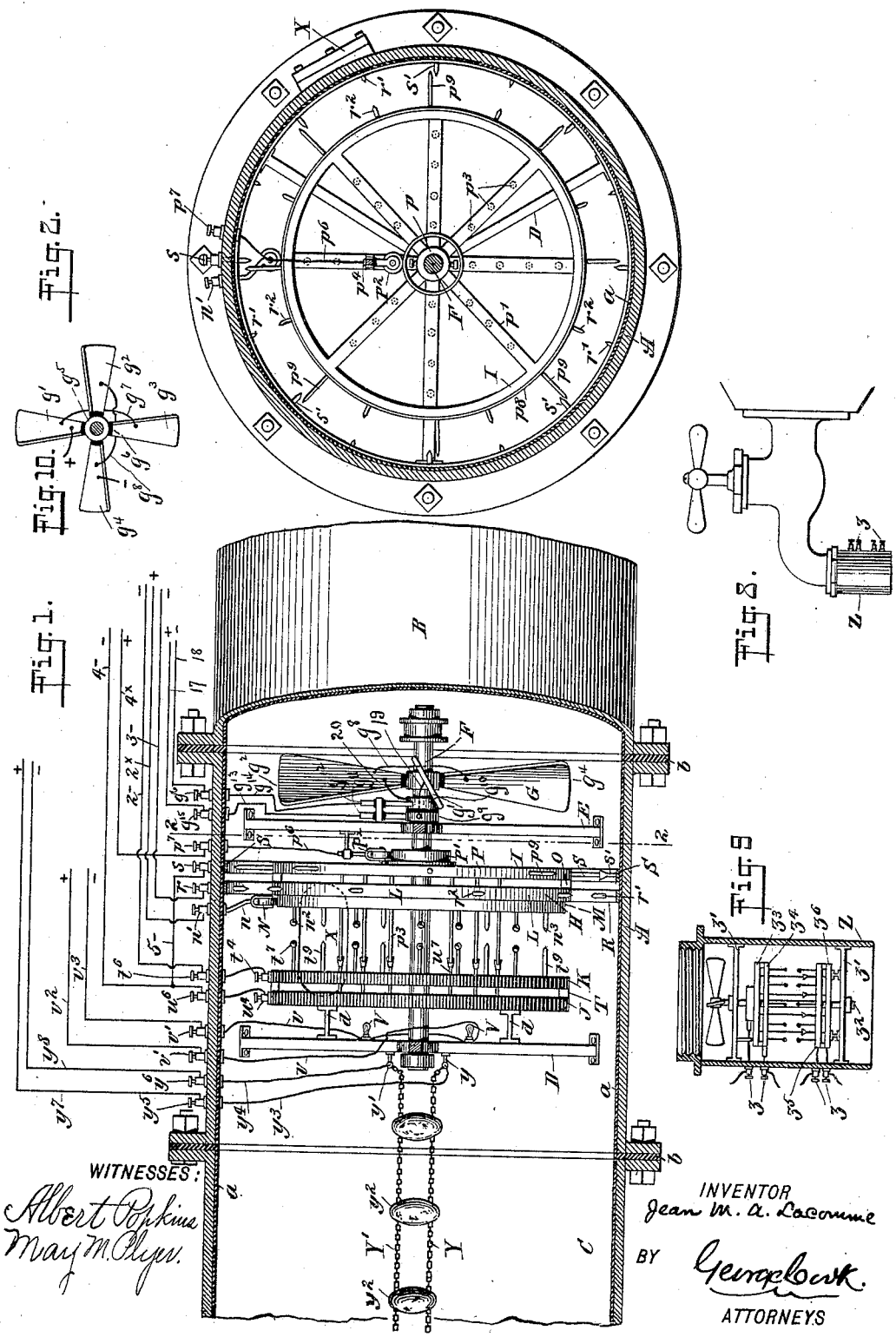
WITNESSES:
Albert Popkins
Mary M. Olyer.
INVENTOR
Jean M. A. Lacomme
BY George Cork
ATTORNEYS

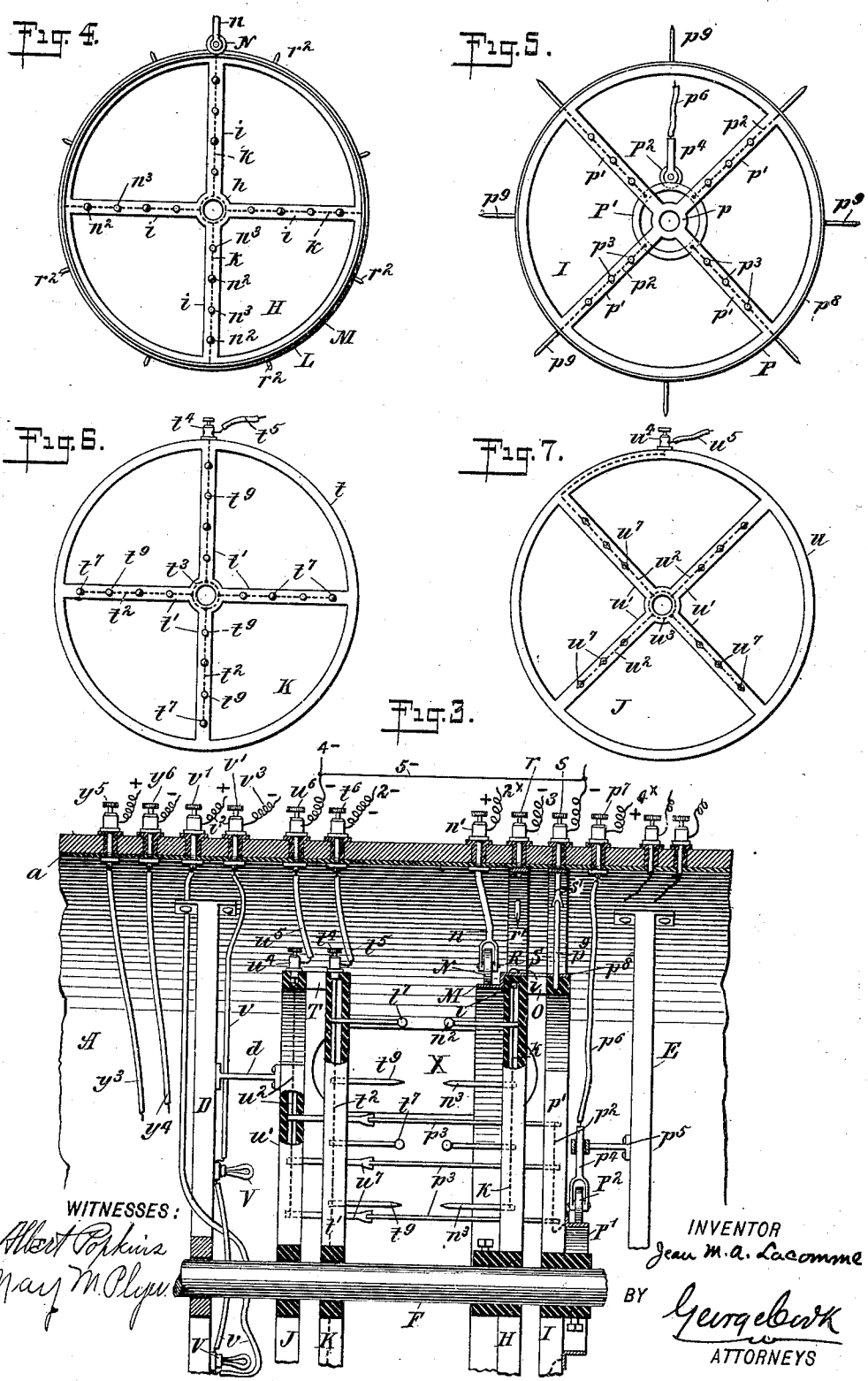

No. 672,230. Patented Apr. 16, 1901.
J. M. A. LACOMME.
APPARATUS FOR THE PURIFICATION OF WATER.
(Application filed Oct. 24, 1900.)
(No Model.)

3 Sheets—Sheet 3.

WITNESSES:
Albert Popkins
H. Joseph Doyle

INVENTOR
Jean M. A. Lacomme
BY George Cook
ATTORNEY

UNITED STATES PATENT OFFICE.

JEAN MARIE AUGUSTE LACOMME, OF BROOKLYN, NEW YORK, ASSIGNOR OF ONE-HALF TO WALTER LAUDER, OF SAME PLACE.

APPARATUS FOR THE PURIFICATION OF WATER.

SPECIFICATION forming part of Letters Patent No. 672,230, dated April 16, 1901.

Application filed October 24, 1900. Serial No. 34,175. (No model.)

*To all whom it may concern:*

Be it known that I, JEAN MARIE AUGUSTE LACOMME, a citizen of the Republic of France, and a resident of New York, borough of Brooklyn, in the county of Kings and State of New York, have made and invented certain new and useful Improvements in Apparatus for the Purification of Water, of which the following is a specification.

My invention relates to an apparatus for use in the treatment of liquids, and more particularly to the treatment of potable water in large quantities as it passes or flows through the mains and pipes of cities and towns or through the pipes in dwellings or other structures.

The object of the invention is to produce a device of this character which shall be simple in construction, economical to install in place and maintain in operation, and efficient in use to destroy disease-germs, bacteria, and the like, and thereby render the water pure and desirable for introduction into the human system.

With this and other ends in view my invention consists in certain novel features of construction and combinations of parts, as will be hereinafter fully described, and specifically pointed out in the claims.

In the accompanying drawings, Figure 1 is a view in elevation of my improved apparatus, the water pipe or main being partially broken away for the purpose of illustration. Fig. 2 is a sectional view on the line 2 2 of Fig. 1. Fig. 3 is an enlarged view of the upper half of the revolving and stationary wheels, partly in section and partly in elevation. Figs. 4 and 5 are detached views of the revolving wheels, and Figs. 6 and 7 are detached views of the stationary wheels. Figs. 8 and 9 are views of modified forms of the apparatus for attachment to a tap or spigot. Fig. 10 is a detached view of the propeller. Fig. 11 is a diagrammatic view showing the arrangement of the electric wires or conductors.

Referring to the drawings, A represents a section of a water pipe or main for conveying or supplying water to cities or towns or to dwellings or other structures and having its inner surface coated or protected by any desired insulating material or substance $a$, the adjacent sections B C of said pipe or main being also insulated on the interior surface and preferably insulated from the section A by the insulating material $b$.

Within and to the section A are secured the brackets or supports D E, in which revolves the shaft F, the latter having secured thereto and near one end thereof the propeller G, of a suitable size to operate the device by the current or passage of the water through the pipe or main. This propeller is preferably constructed of four blades $g'$, $g^2$, $g^3$, and $g^4$, radiating from the hub $g^5$ and insulated therefrom, as shown at $g^6$. The alternate blades $g'$ and $g^3$ are electrically connected by the wire $g^7$, and the blades $g^2$ and $g^4$ by the wire $g^8$, as shown in Figs. 2 and 10. To the shaft F and in close proximity to the propeller G are secured the commutators $g^9$ and $g^{10}$, operating in connection with the brushes $g^{11}$ and $g^{12}$, respectively, from which brushes lead the wires or conductors $g^{13}$ and $g^{14}$ to the binding-posts $g^{15}$ and $g^{16}$, fastened or secured to the main or pipe A, Fig. 1. From the said binding-posts lead the wires 17 18 to the positive and negative poles of an induction-coil of ordinary construction. (Not shown.) From the commutator $g^9$ leads a wire 19 through an opening in the commutator $g^{10}$ to the blade $g'$, and from the commutator $g^{10}$ leads the wire 20 to the blade $g^2$ of the propeller, the purpose and effect of this construction and arrangement being to charge the alternate blades with a positive and the other blades with a negative current of electricity, so that the circuit from blade to blade will be completed through the water between the blades, and thus assist the remaining portions of the apparatus in killing or destroying any germs or microbes that may be present in the water so charged with the induced currents.

To the shaft F and between the brackets or supports D E are secured the rotating wheels H I, and to the supports D are secured, by means of brackets $d$, the stationary wheels or rings J K, one object of these wheels or rings, as hereinafter explained, being to so charge the water passing through the main with electricity as to wholly or completely destroy any germs, microbes, or animalculæ that might be contained therein. In order to present as little obstruction as possible to the water flowing through the main, the several wheels are constructed in skeleton form, the rotating wheel H being formed with a hub $h$ and spokes $i$, of vulcanite, hard rubber, or other desirable insulating material, and with a metallic rim L, the same being bent or flanged, as shown in section in Fig. 3, to form a track or flange M for the purpose as hereinafter described. Within the spokes $i$ of said wheel H are contained the wires or electric conductors $k$, the wire in each spoke being electrically connected with the rim L M of the wheel, as shown at 1, Fig. 3. On the track or flange M of the rim L bears the rolling contact N in the form of a wheel or disk mounted or secured to the lower end of a rod $n$, the upper end of said rod, preferably flexible, being secured or fastened in the binding-post $n'$, which latter in turn is secured to the section A of the pipe or main. From each of the spokes $i$ project the wires or rods $n^2$, of copper, silver, platinum, or other desired metal, the outer ends being formed into balls or knobs for a purpose hereinafter explained and the inner ends electrically connected with the wires or conductors $k$. From the spokes $i$ also project the wires or rods $n^3$, of copper, silver, platinum, or other desired metal, the latter alternating with the rods $n^2$, the outer free ends of said rods or wires $n^3$ being pointed and the inner ends electrically connected with the wires or conductors $k$, as shown in Fig. 3 of the drawings. Within the section A of the pipe or main and opposite to the wheel H is secured a metallic ring R of a width substantially corresponding to the width of said wheel H and which metallic ring R is electrically connected with the binding-post $r$, fastened or secured to the section A, as illustrated in Fig. 3, the ring R having the metallic rods $r'$ projecting inwardly therefrom toward said wheel H, and from the rim of which said wheel H also radiate the corresponding pointed rods $r^2$, the purpose and function of which parts will be hereinafter described. The second rotating wheel I, which is also bolted or otherwise secured to the shaft F and which rotates with said wheel H and connected thereto by means of the ring O, is also preferably constructed of vulcanite, hard rubber, or other insulating material and consists of the rim P, hub $p$, and spokes $p'$, Fig. 5, said spokes having embedded or contained therein the wires or electric conductors $p^2$, as shown in Figs. 3 and 5. From the spokes $p'$ of this wheel I project the long flexible rods $p^3$, the inner ends of which are electrically connected with the wires or conductors $p^2$, their outer free ends adapted to come in contact with small rods, hereinafter referred to, as the said wheel I rotates in order to generate electric sparks, as will be fully explained hereinafter. The wires or conductors $p^2$, before referred to, are also connected with the metallic ring or flange P′, secured to the outer face of the wheel I and forming a track for the rolling contact P², mounted upon a rod $p^4$, held in position by the support or bracket $p^5$ and insulated therefrom, said rod $p^4$ being electrically connected by means of the conductor $p^6$ with the binding-post $p^7$, secured in the section A of the pipe or main. Around the wheel I may extend, if desired, a metal ring $p^8$ and to which may be connected the wires or conductors $p^2$, though the same is not absolutely essential. From the rim P of the wheel I radiate the flexible rods $p^9$, the inner ends of said rods being connected with the wires or conductors $p^2$ or, if desired, with the metallic ring or rim $p^8$, the outer free ends of said flexible rods adapted to come in contact with corresponding rods for the purpose of producing electric sparks, hereinafter fully described.

Within the section A of the pipe or main and to the inner insulated surface thereof is secured a metallic ring S, of a width substantially equal to the width of the rim of the wheel I, said ring S being electrically connected with the binding-post $s$, fastened to the section A of the pipe or main. From this ring S project inwardly the rods $s'$, the ends of which are slightly enlarged for the purpose of contacting with the flexible rods $p^9$, radiating from the rim of the wheel P and, as hereinafter explained, producing a series of sparks as the said wheel I rotates.

The stationary rings or wheels J K are secured to each other by means of the intermediate ring T, said ring or wheel J being secured to the bracket arms or supports $d$, which in turn are secured to the support D, as before described. These rings or wheels J K are preferably constructed of vulcanite, hard rubber, or other insulating material, the said ring or wheel K consisting of the rim $t$ and spokes $t'$, in which spokes are embedded or contained wires or electric conductors $t^2$, connected with each other around the hub, as shown at $t^3$, Fig. 6, one end of said wire or conductor $t^2$ being connected with the binding-post $t^4$, which binding-post, as shown in Fig. 3, is connected by the wire or conductor $t^5$ to the binding-post $t^6$, fastened to the section A of the pipe or main. From the spokes $t'$ of the ring or wheel K project the rods $t^7$, the outer free ends of which are enlarged, as shown in Figs. 1 and 3, the inner ends of the same being electrically connected with the wires or conductors $t^2$. From the spokes of the wheel K also project the rods $t^9$, the inner ends of which are connected with the wires or conductors $t^2$ and the outer or free ends being pointed like or corresponding to the rods $n^3$, projecting from said wheel H, the rods $t^7$ and $t^9$ alternating, as shown in the several figures of the drawings. The stationary wheel or ring J consists of the rim $u$ and spokes $u'$, preferably constructed of vulcanite, hard rubber, or other non-conducting material, said spokes $u'$ having contained or embedded therein the wires or electric conductors $u^2$, connected with each other around the hub, as shown at $u^3$, Fig. 7, and with a binding-post $u^4$, said binding-post in turn being connected by the wire or conductor $u^5$ to the binding-post $u^6$, fastened or secured to the section A of the pipe or main. From the spokes $u'$ of the wheel J project the rods $u^7$, the inner ends of which are connected with the wires or conductors $u^2$ and the outer free ends of which are enlarged for the purpose of forming contact-points.

From the binding-post $t^6$, which is electrically connected with the ring or wheel K, leads the wire 2, and from the binding-post $n'$, electrically connected, through the medium of the rolling contact N, with the wheel H, leads the wire $2^\times$ respectively to the negative and positive poles of a battery-dynamo or other source of electricity 27, an induction-coil 25 being placed in the circuit for the purpose of supplying an induced current to said ring and wheel.

From the foregoing it will be understood that as the wheel H rotates with the shaft F the rolling contact N will travel upon the flange or track M and a positive current of electricity constantly supplied thereto, the effect being that as the rods $t^7$, supplied with the negative current, come opposite to the rods $n^2$, supplied with the positive current, the water between the rounded ends thereof will complete the circuit, the current escaping from the knobs comparatively slowly, and as the pointed rods $t^9$, supplied with the negative current, come opposite the rods $n^3$, supplied with the positive current, during the rotation of the wheel H the circuit will be completed through the water between the pointed ends of said rods, the escape of the current from point to point being comparatively quick. Thus it will be seen that as the wheel H rotates and its projecting rods come opposite the projecting rods from the stationary ring or wheel K there will be a constant induced current of electricity escaping from one to the other, the circuit being completed through the water as it passes between said rotating wheel and stationary ring, the supply of electricity being taken from a battery, dynamo, or other suitable source and of sufficient power to kill any microbes, bacteria, germs, or other animalculæ that may be present in the water. In order to also charge the water flowing over or around the wheel in contradistinction to that flowing through the wheel and between the spokes of the wheel H, the binding-post $r$ is connected with a pole of said induction-coil 25 by means of the wire 3, the effect being that the circuit will be completed from the rods $r'$, projecting from the ring R, connected with said binding-post $r$, and from the pointed rods $r^2$, projecting from the rim of the wheel H, through the water between said rods. In other words, the water as it flows between the wheel H and the ring K will be fully charged with an induced current of electricity, as will also the water which flows between the rim of said wheel H and the ring R, the water itself completing the circuit between the projecting rods of the parts.

From the binding-post $p^7$, which, as before stated, is electrically connected through the medium of the rolling contact $P^2$ and ring $P'$ with the wheel I, leads a conducting-wire $4^\times$, Fig. 1, to the positive pole of a sparking-coil 26, and from the binding-post $u^6$, electrically connected with the stationary ring or wheel J, leads the conducting-wire 4 to the negative pole of said sparking-coil 26, the effect being that as the wheel I rotates with the shaft F the ends of the flexible rods $p^3$ come in contact with the rods $u^7$, projecting from the spokes $u'$ of the wheel J, and produce a series of sparks, thereby assisting in the destruction of the germs, microbes, and other organic life which may be present in the water, and, further, decomposing a portion of the water into hydrogen and oxygen gases.

For the purpose of increasing the number of sparks I connect the binding-post $s$, which, as before stated, is electrically connected with the ring S, with the wire or electric conductor 4 by means of the wire or conductor 5, or it may be connected with the binding-post $u^6$, with which said conductor 4 is connected, the effect being that as said wheel I rotates the flexible rods $p^9$, radiating from the rim thereof, coming in contact with the rods $s'$, connected to said ring S, will also produce a series of sparks, the flexible rods $p^9$, radiating from the rim of said wheel I, being supplied with the positive current through the wire or conductor $4^\times$, and the rods $s'$ supplied with the negative current through the wires 5 4.

In order to further destroy germs, microbes, &c., which develop and exist in darkness, I secure to the bracket or support D two or more incandescent lamps V, to which lead the wires or conductors $v$, secured to the binding-posts $v'$, fastened or secured in the section A of the pipe or main, and from which binding-post $v'$ lead the wires or conductors $v^2$ $v^3$ to the positive and negative poles of a battery or other suitable source of electricity. In addition to this function these incandescent lamps serve the purpose of illuminating the interior of the section A of the pipe or main, whereby it is possible to watch the operation of the device through the glass window X, inserted or built in the section A of said pipe.

For the purpose of further charging the water with electricity I secure to the standard D two insulating-posts $y$ $y'$, to which are respectively secured the metal chains Y Y', said chains at predetermined distances passing through pieces of cork $y^2$ or other buoyant non-conducting material, said cork or other material preventing the chains from coming in contact with the metal of which the pipe or main is constructed. To these chains lead the wires or electrical conductors $y^3$ $y^4$, connected at their outer ends with the binding-posts $y^5 y^6$, from which lead the wires $y^7 y^8$ to the poles of an induction-coil 25 for the purpose of supplying an induced current to said chain, the water between said chains completing the circuit and being thereby electrically charged for the purpose of destroying any organic life that perchance may have passed through the apparatus before described.

From the foregoing it will be understood that the device is exceedingly simple in construction, consisting, substantially, of one or more rotating skeleton wheels and one or more stationary wheels or rings and so constructed and arranged with relation to each other that the water flowing through and around them will be fully acted upon by induced currents of electricity and with electric sparks, the flow of the water through the main or pipe supplying the power to drive or rotate the wheels, the speed of said wheels being determined by the speed or current of the water through the pipe—that is, the faster the flow of water the faster will the propeller drive the wheels, and consequently the greater number of makes and breaks in the circuits and a greater number of sparks, and, vice versa, the slower the flow of the water, and consequently the less amount of water passing through the device, the less number of makes and breaks and a less amount of sparking.

It will of course be evident to those skilled in the art that many changes may be made in the device in the matter of details of construction and arrangements of parts without departing from the spirit and scope of my invention—as, for instance, instead of the tracks M P' and rolling contacts N P² commutators and brushes may be substituted therefor with good effect. Again, if desired, both the rotating and stationary sparking-wheels may be omitted or the number increased, as may also be the case in the matter of the rotating and stationary induction-wheels. Again, instead of employing the propeller described a small electric motor may be arranged within or without the pipe and belted or otherwise connected with the shaft F for the purpose of turning or rotating the same. Further, instead of having the wheels or rings J K stationary it will be understood without further illustration that they may be mounted on a separate shaft and by means of a propeller turned or rotated, as are the wheels H I, excepting in an opposite direction. Again, the device may be somewhat modified for use in connection with a tap or spigot, as illustrated in Figs. 8 and 9, wherein the lamps and chains before referred to are omitted. In these figures small casings Z contain the device, the binding-posts $z$ being secured thereto for attachment of the wires (not shown) for the sparking and induction coils. The brackets or supports are represented at $z'$, the shaft at $z^2$, the wheels at $z^3$ and $z^4$, and the stationary rings or wheels at $z^5 z^6$. The remaining parts may be constructed and arranged as before described.

I do not therefore limit my invention to the exact description shown and described; but, Having fully described my invention, what I claim as new, and desire to secure by Letters Patent, is—

1. An apparatus contained within a water-pipe for the purpose described, and consisting of a wheel or wheels provided with sparking-rods projecting therefrom, a motor for rotating said wheel, a stationary ring or rings provided with sparking-rods, a sparking-coil connected with said sparking-rods on said wheel and ring and with a suitable source of electricity, said sparking-rods being so arranged as to contact when said wheel and ring are in certain relative positions, and to produce a series of sparks in the water flowing through said apparatus, substantially as described.

2. An apparatus of the character described, consisting of rotating wheels, and opposing rings, said wheels and rings being provided with both electrodes and sparking-rods, and with suitable electrical connections, substantially as described.

3. In an apparatus of the character described, the combination with a rotating wheel having conducting-rods projecting from the rim and spokes thereof, said rods being electrically connected with each other and with a suitable source of electricity, of an opposing stationary ring also formed with conducting-rods projecting therefrom, and connected with each other and to said source of electricity, whereby the circuit through said rods will be completed through the water between said rods, substantially as described.

4. In an apparatus of the character described, a rotating wheel constructed with spokes containing electric conductors, conducting-rods projecting from said spokes and connected at their inner ends with said conductors, the outer ends of the alternating rods being rounded and the others pointed, an opposing ring provided with electrodes, said rods and electrodes being connected with a suitable source of electricity, substantially as described.

5. In an apparatus of the character described, the combination with a rotating sparking-wheel constructed with flexible sparking-rods connected with each other and to a sparking-coil, of a stationary sparking-ring provided with conducting-rods projecting therefrom, and connected with each other and with said sparking-coil, the conducting-rods of said wheel being adapted to come in contact with the rods of said ring and produce a series of sparks as said wheel is rotated, substantially as described.

6. In an apparatus of the character described, the combination with a rotating shaft, of an electrode-wheel secured thereto and provided with electrodes connected with each other and with an induction-coil, a wheel secured to said shaft and provided with sparking-rods connected to each other and to a sparking-coil, a stationary ring provided with electrodes connected with each other and to said induction-coil, and a stationary sparking-ring provided with sparking-rods connected with each other and to said sparking-coil, whereby when said wheels are rotated the water will be charged with induced currents and with a series of sparks, substantially as described.

7. In an apparatus of the character described, the combination with a water-main, of a propeller mounted therein, and constructed with its alternate blades electrically connected with each other and with opposite poles of a suitable source of electricity, and insulated from the hub thereof, whereby the circuit from blade to blade will be completed through the water between said blades, substantially as described.

8. In an apparatus of the character described, the combination with a water-main, of wheels and rings provided with conducting-rods connected with a suitable source of electricity, two chains held out of contact with each other and connected with opposite poles of said source of electricity, and means for preventing contact of said chains with the said pipe or main, substantially as described.

9. The combination with the water-main A and shaft F mounted therein, of a wheel I provided with sparking devices constructed and arranged substantially as described, a track P' connected with said wheel I and sparking devices, rolling contact P² bearing on said track and connected with one pole of a sparking-coil, and the stationary sparking-ring J, the several parts being constructed and arranged substantially as described.

10. The combination with the water-main A and shaft F mounted therein, of the propeller G secured to said shaft and in position to rotate the same by means of the flow of water through said main, electrode-wheel H and sparking-wheel I secured to and rotating with said shaft and provided with electrodes and sparking-rods respectively, stationary ring K and sparking-ring J, said rings being provided with electrodes and sparking-rods respectively, lamps V and chains Y Y' contained within said main, the several parts being connected with suitable sources of electricity as described, whereby the water flowing through the main will be acted upon by electric currents and sparks, substantially as described.

Signed at New York, in the county of New York and State of New York, this 23d day of October, A. D. 1900.

JEAN MARIE AUGUSTE LACOMME.

Witnesses:
WALTER LAUDER,
GEORGE COOK.